(12) United States Patent
Vig

(10) Patent No.: US 7,233,187 B2
(45) Date of Patent: Jun. 19, 2007

(54) DUAL-MODE PULSE GENERATOR

(75) Inventor: Harry Vig, North Billerica, MA (US)

(73) Assignee: MagiQ Technologies, Inc., New York, NY (US)

( * ) Notice: Subject to any disclaimer, the term of this patent is extended or adjusted under 35 U.S.C. 154(b) by 65 days.

(21) Appl. No.: 11/191,662

(22) Filed: Jul. 28, 2005

(65) Prior Publication Data

US 2006/0033545 A1    Feb. 16, 2006

Related U.S. Application Data

(60) Provisional application No. 60/601,906, filed on Aug. 16, 2004.

(51) Int. Cl.
    *G06F 1/04* (2006.01)
(52) U.S. Cl. .................. 327/291; 327/293; 327/294
(58) Field of Classification Search ............ 327/165, 327/166, 172, 176, 291, 293, 294
    See application file for complete search history.

(56) References Cited

U.S. PATENT DOCUMENTS

| | | | |
|---|---|---|---|
| 6,741,102 B1 | 5/2004 | Thomas | |
| 6,788,119 B1 | 9/2004 | Hyland | |
| 6,943,603 B2 | 9/2005 | Jinbo | |
| 6,963,236 B2* | 11/2005 | Berkram et al. | 327/238 |
| 2002/0010853 A1* | 1/2002 | Trimberger et al. | 713/1 |
| 2005/0083098 A1* | 4/2005 | Matsui et al. | 327/291 |

OTHER PUBLICATIONS

Fairchild Camera and Instrument Corp, Inc., "ECL Data Book," Data Sheet (1997) (Circuit Diagram and Properties).
Blood, Jr., "MECL System Design Handbook," p. 203 MECL one-shot multi-vibrator circuit (Motorola, Inc., Dec. 1977).

* cited by examiner

*Primary Examiner*—Timothy P. Callahan
*Assistant Examiner*—Colleen O'Toole
(74) *Attorney, Agent, or Firm*—Opticus IP Law PLLC

(57) ABSTRACT

A pulse generator electrical circuit capable of operating as both a clock-based pulse generator and a delay-based pulse generator while minimizing the limitations of these two types of pulse generators is disclosed. When the pulse generator operates in "delay mode," the smallest output pulse width possible corresponds to the minimum set point delay between the two delay circuits. The largest possible output pulse width corresponds to the difference between the maximum and minimum of the delay circuits. When the pulse generator operates in "clock mode," the output of one of the delay circuits is blocked so that the output of the gate depends solely on the output of other delay circuit. This limits the lower pulse width interval to that of the retimer clock, but allows for an arbitrarily long (wide) pulse.

3 Claims, 3 Drawing Sheets

DUAL-MODE PULSE GENERATOR

CLAIM OF PRIORITY

This application claims priority from U.S. patent application Ser. No. 60/601,906, filed on Aug. 16, 2004.

FIELD OF THE INVENTION

The present invention relates to electrical pulse generators, and in particular relates to a pulse generator capable of operating in two different modes.

BACKGROUND OF THE INVENTION

There are a variety of device applications that require the generation of electrical pulses. Electrical pulses are typically generated by electrical circuits called "pulse generators". Pulse generators are used, for example, to create the timing signals necessary to coordinate the logic operations of a microprocessor. Pulse generators generally fall into two categories: clock based and delay based.

Clock-based pulse generators are generally capable of generating arbitrarily long pulses. However, the minimum time interval between pulses is limited by the clock period.

Delay-based pulse generators rely on the time delay incurred by passing signals through a device or set of devices. The time delay is based on the transition time or difference in transition time of signals. The disadvantages of this type of pulse generator include that the maximum delay that can be obtained is limited, and the timing jitter increases with the delay or pulse width.

There are some device applications that would benefit from a pulse generator that has the advantages of each of the above-mentioned pulse generators while minimizing their respective disadvantages.

One such application is quantum key distribution (QKD). The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175–179 (IEEE, New York, 1984). Specific QKD systems are described in publications by C. H. Bennett et al entitled "Experimental Quantum Cryptography," and C. H. Bennett entitled "Quantum Cryptography Using Any Two Non-Orthogonal States", Phys. Rev. Lett. 68 3121 (1992), as well as in U.S. Pat. No. 5,307,410 to Bennett (the '410 patent). The general process for performing QKD is described in the book by Bouwmeester et al., "The Physics of Quantum Information," Springer-Verlag 2001, in Section 2.3, pages 27–33.

Generally, in QKD weak light pulses (e.g., less than one photon per pulse on average according to Poissonian statistics) need to be emitted and detected with high precision. This requires generating precise synchronization and gating pulses for the system. The above-mentioned shortcomings of the prior art pulse generators make them inefficient and impractical to use for a commercially viable QKD system. For example, one pulse generation mode for generating long (e.g., on the order of microseconds) pulses is required for setting up and calibrating the system, while another pulse generation mode is required for generating pulses on the order of 500 ps when operating the system. While two different types of pulse generators could be used to generate the two types of pulses, this option is expensive and adds complexity to the system.

SUMMARY OF THE INVENTION

An aspect of the invention is a pulse generator electrical circuit capable of operating as both a clock-based pulse generator and a delay-based pulse generator. The pulse generator of the present invention is intended obviate the need for having two different types of pulse generators to generate two different types of pulses (e.g., long and short).

When the pulse generator operates in "delay mode," the smallest (shortest) output pulse width possible corresponds to the minimum set point delay between the two delay circuits. The largest (longest) possible output pulse width corresponds to the difference between the maximum and minimum of the delay circuits.

When the pulse generator operates in "clock mode," the output of one of the delay circuits is blocked so that the output of the gate depends solely on the output of other delay circuit. This limits the lower pulse width interval to that of the retimer clock, but allows for an arbitrarily long (wide) pulse.

The operation mode of the pulse generator is determined by a timing generator, which provides a mode-select control signal to one of two delays, wherein the output of the delays is inputted into a logic gate to generate an output signal. The timing generator includes an FPGA that is programmed by a controller that provides select values to the FPGA registers that defines the mode-select control signal.

Figure 1:
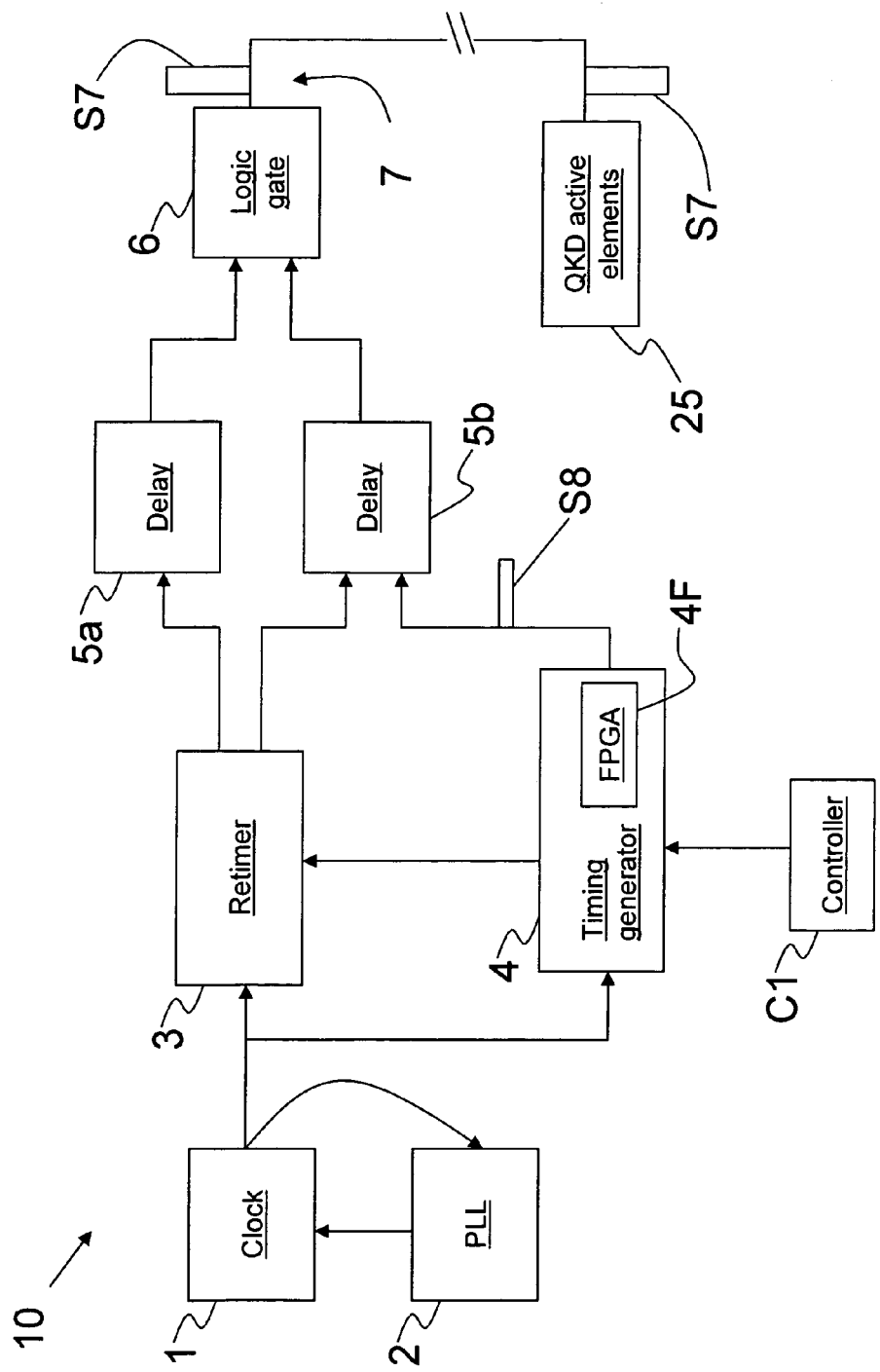
FIG. 1 is a schematic diagram of the dual-mode pulse generator of the present invention, shown along with an active element for a QKD system.

The various elements depicted in the drawings are merely representational and are not necessarily drawn to scale. Certain sections thereof may be exaggerated, while others may be minimized. The drawings are intended to illustrate various embodiments of the invention that can be understood and appropriately carried out by those of ordinary skill in the art.

DETAILED DESCRIPTION OF THE INVENTION

The present invention is directed to a single pulse generator electrical circuit that can act as both a clock-based pulse generator and a delay-based pulse generator, while minimizing the limitations of these two types of pulse generators. The two operational modes referred to below are "clock mode" and "delay mode." Also, the terms "pulse" and "signal" are used interchangeably below.

FIG. 1 is a schematic diagram of the dual-mode pulse generator 10 of the present invention. Circuit 10 includes a clock 1 coupled to a phase-lock loop (PLL) 2. The output of clock 1 is inputted to a retimer clock ("retimer") 3, controller PLL 2, and is inputted to a timing generator 4. In a preferred embodiment, timing generator 4 includes an FPGA 4F that has programmable registers. Pulse generator 10 also includes controller C1 (e.g., a computer or microprocessor) operatively coupled to timing generator 4. In an example embodiment, controller C1 is adapted to program timing generator 4, e.g., to perform register programming and/or to place select values in the FPGA registers. The select values define a mode-select pulse S8, discussed below.

Retimer 3 is also coupled to timing generator clock ("timing generator") 4.

Pulse generator 10 also includes two delay circuits ("delays") 5a and 5b. The output of retimer 3 is inputted to delays 5a and 5b and the output of timing generator 4 is inputted to delay 5b. The output of delays 5a and 5b are input into a logic (e.g., an AND or OR) gate 6, which compares the inputted pulses and generates an output signal (pulse) S7 at output 7.

In an example embodiment, mode select control signal S8 is used by the timing generator 4 to select the delay mode or the clock mode. In putting circuit 10 in delay mode, signal S8 deactivates (inhibits) delay 5b.

In an example embodiment of a QKD system, output signal S7 is used to gate one or more of the QKD active elements 25 in the QKD system. In example embodiments, QKD active element(s) 25 include a single-photon detector, a modulator driver, a laser driver, a variable optical attenuator, etc.

Clock 1 and PLL controller 2 form a low-jitter clock source to clock timing generator 4 and to retime the pulse data via retimer 3. The timing generator 4 creates the pulse pattern and selects the pulse generator mode based on the input from controller C1. In an example embodiment, the two different modes of operation are selected via the FPGA registers. For example, the timing register divides the clock into segments of 256 pulses and uses programmed register values to define a timing pulse of a desired width between 1 and 256 clock signal widths and starting on any clock edge from 1 to 256 clock cycles from the first clock edge in every 256 clock sequence.

Retimer 3 receives data (electrical signals) from timing generator 4 and synchronizes it with the low-jitter clock. This allows the data to pass through with the timing uncertainty removed.

Delays 5a and 5b delay the retimed pulses with an accuracy much shorter than the clock period, but with a relatively short maximum value to keep jitter low.

Gate 6 outputs a pulse S7 ("output signal") based on the difference between the two delays.

A mode select control signal S8 is generated by timing generator 4 to select delay mode or clock mode operation of the pulse generator 10. When delay mode is selected, delay 5b works in its normal state, delaying the signal from input to output ports for the programmed time delay. When clock mode is selected, the operation of delay 5b is inhibited and the output is forced to the null state of gate 6, with the result that the output from delay 5a is not masked.

When pulse generator 10 operates in delay mode, the smallest output pulse width possible corresponds to the minimum set point delay between the two delays 5a and 5b. The largest possible output pulse width corresponds to the difference between the maximum and minimum delays of delays 5a and 5b.

When pulse generator 10 operates in clock mode, the output of delay 5b is blocked, and the output signal S7 of gate 6 depends solely on the output of delay 5a. This limits the lower pulse width interval to that of the retimer clock, but allows for an arbitrarily long (wide) pulse.

Figure 2:
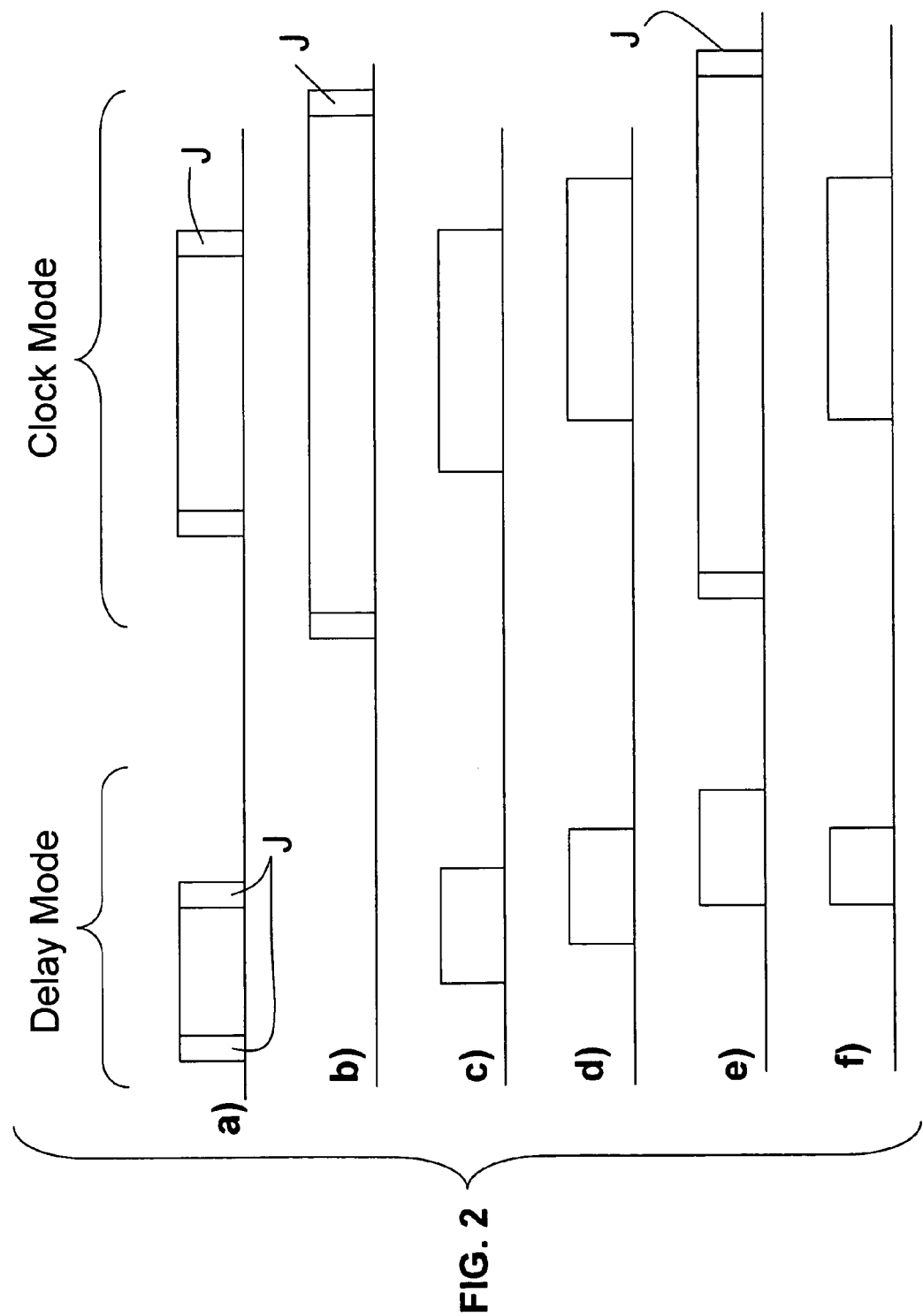
FIG. 2 is a timing diagram with different sequences (time lines) a) through f) the illustrating electrical pulses associated with the clock and delay modes of operation of the pulse generator 10 of FIG. 1 for different parts of the circuit.

FIG. 2 is a timing diagram illustrating the pulse widths for two different electrical signals corresponding to the two different modes. The form of the electrical signals for different parts of the pulse generator circuit 10 of FIG. 1 are illustrated in the sequence of signal time lines labeled (a) through (f). The narrow rectangular regions at the beginning and end of some of the signals represent timing uncertainty titter) J. The output is in delay mode for the first transition as indicated by arrow A, and in clock mode for the second transition as indicated by arrow B.

In FIG. 2, time line (a) corresponds to timing generator 4. Its width and position in time is defined by register(s) 4F in the FPGA 4. It has timing uncertainty due to the jitter generated in the FPGA, indicated by the rectangles at the start and end of each pulse.

Time line (b) shows the output control from FPGA 4 needed to place the circuit in delay mode for the first pulse in timeline (a, and in clock mode for second pulse in timeline (a). It too has timing uncertainty, but it does not overlap with either signal in timeline (a) within the time interval of one clock cycle.

Timeline (c) shows the output of the pulses in timeline (a) after being retimed by retimer 3. Note that the timing uncertainty is reduced to the point of being negligible (i.e., the timing uncertainly is reduced by about a factor of 100) but the transitions are delayed. This is because edges are defined by the low jitter clock source 1 feeding the retimer 3.

Timelines (d) and (e) show the signal from delay blocks 5a and 5b respectively. They are delayed from timeline (c) because of the action of delay lines 5a and 5b. The delayed signal has the same small timing uncertainty as timeline (c) because of the technology used, except in the case of delay 5b where the FPGA 4 placed the circuit in delay mode by inhibiting delay 5b. The inhibit command has relatively large timing uncertainty, but this is inconsequential as long as the change in signal does not overlap with the pulse in timeline (d).

Timeline (e shows the output pulse S7. The first output pulse in timeline (f) shows the output in delay mode. The pulse can be made as short as the resolution of delay lines 5a and 5b, but has a maximum width limit as described above. The second output pulse in timeline (f) is for the clocked mode. Its position is arbitrary, and the delay time can be positioned with the fine resolution of the delay line 5a. Its width is determined by the timing generation in the FPGA 4, clocked by clock 1 and retimer 3, which limits its timing resolution. A typical value is 10 ps for the delays 5a and 5b, and 5 ns for the clock 1 and retimer resolution.

Note that in both cases, the timing uncertainty of the pulse(s) in timeline (f) is low.

The advantages of pulse generator 10 of the present invention include 1) it allows for short, precise pulses limited only by the bandwidth of the gate 6 and trailing pulse amplifiers, 2) it allows arbitrarily long pulse widths, 3) it produces both short and long pulses with minimal jitter, and 4) it uses the same circuit traces for both modes, so that high-speed circuit performance is the same for both modes and needs to be optimized only once.

It should be mentioned that clock mode is required for pulse widths longer then the maximum delay possible using differential delay mode. In this case, clock granularity is still a limit of timing generator 4 output pulse width resolution.

Figure 3:
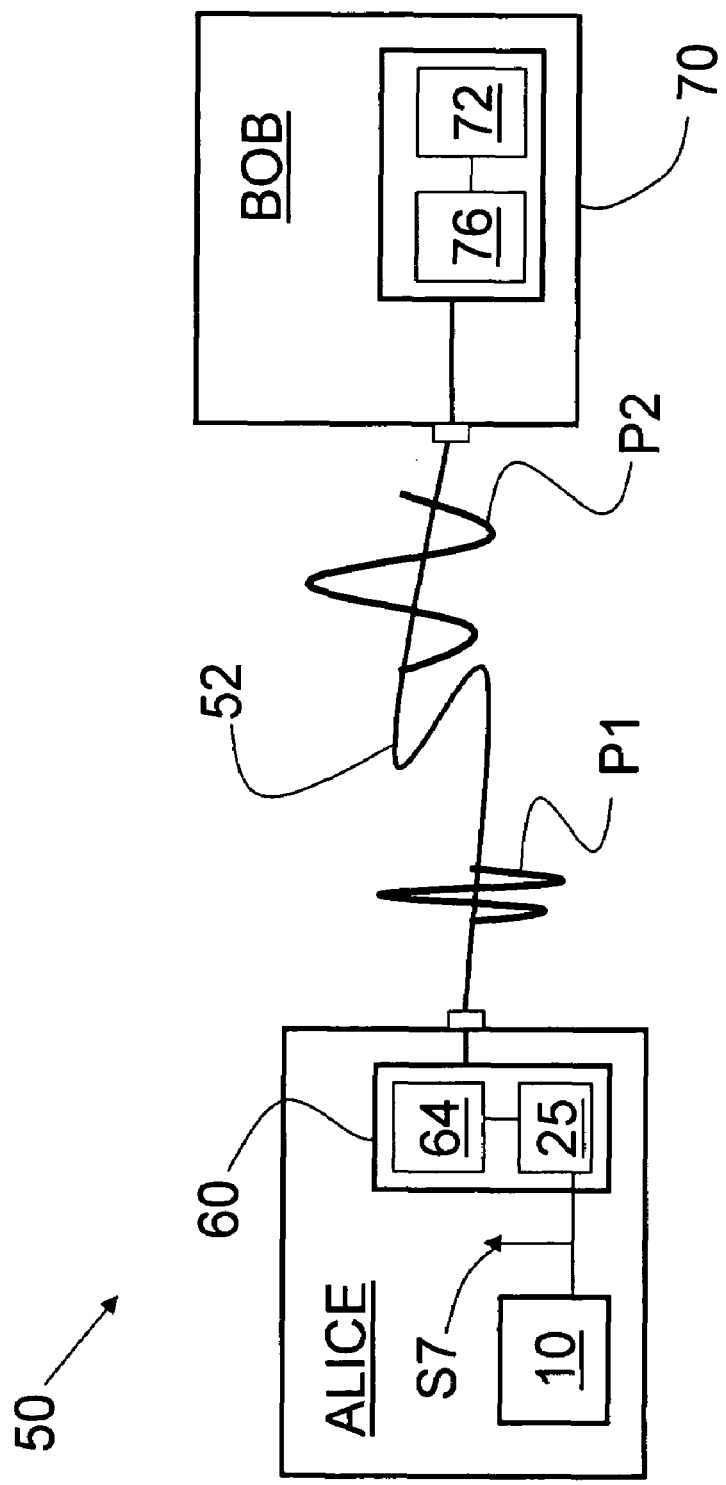
FIG. 3 is a schematic diagram of a QKD system that illustrates how the dual-mode pulse generator of the present invention is used to generate two different types of optical pulses in a QKD system based on operating the pulse generator in the delay and clock modes.

Pulse generator 10 has particular utility in connection with quantum cryptography, and in particular, quantum key distribution (QKD) systems such as QKD system 50 illustrated schematically in FIG. 3. QKD system 50 includes a first QKD station ALICE optically coupled to a second QKD station BOB via an optical fiber 52. ALICE includes pulse generator 10 operably coupled to a radiation source unit 60 that includes a laser driver 25 (as one of the examples of a QKD system active element discussed above), and a laser 64. BOB includes a single-photon-detector (SPD) unit 70 that includes single-photon detectors 72 and SPD discriminators 76.

In an example embodiment of the operation of QKD system 50, pulse generator 10 is employed to generate all of the high speed, narrow-width optical pulses P1 used in the QKD process by operating in delay mode and providing the corresponding output signals S7 to laser driver 25. It allows for single-photon detector (SPD) discriminators 76 to be left open full time and to use the SPDs 72 in the avalanche mode, as opposed to operating in Geiger mode. Also in an example embodiment, pulse generator 10 is also used in clock mode to generate large-pulse-width laser pulses (i.e., temporally long optical pulses) P2 to measure optical fiber parameters, e.g., when the optical pulse intensity levels are too low, and to perform system calibration. This is accomplished by providing laser driver 25 with output signals S7 that correspond to the clock mode output as described above.

In the foregoing Detailed Description, various features are grouped together in various example embodiments for ease of understanding. The many features and advantages of the present invention are apparent from the detailed specification, and, thus, it is intended to cover all such features and advantages of the described apparatus that follow the true spirit and scope of the invention. Furthermore, since numerous modifications and changes will readily occur to those of skill in the art, it is not desired to limit the invention to the exact construction, operation and example embodiments described herein.

What is claimed is:

1. A pulse generator comprising:

a clock adapted to generate clock pulses;

a phase lock loop (PLL) operably coupled to the clock so that the clock pulses have reduced jitter;

a retimer operatively coupled to the clock;

first and second delays operatively coupled to an output of the retimer and each having an output;

a timing generator operatively coupled to an input of one of the first and second delays;

a logic gate coupled to receive the outputs of the first and second delays and adapted to generate an output pulse based on the outputs of the first and second delays; and wherein the timing generator is operatively coupled to the retimer and the retimer retimes clock signals from the timing generator based on the reduced-jitter clock pulses, and wherein the timing generator includes a field-programmable gate array adapted to allow the pulse generator to operate in one of a clock mode and a delay mode.

2. The pulse generator of claim 1, wherein setting the mode of operation includes the timing generator sending a mode-select control signal to the second delay.

3. The pulse generator of claim 1, wherein the FPGA includes registers, and wherein the FPGA is coupled to a controller that inputs values into the registers corresponding to one of the clock mode and delay mode.

\* \* \* \* \*